3,274,731
METHOD OF MULCHING

Richard E. Vigneault, Raleigh, N.C., and Kenneth C. Finster and John V. Landry, Lake Jackson, Tex., assignors to The Dow Chemical Company, Midland, Mich., a corporation of Delaware
No Drawing. Filed Feb. 14, 1964, Ser. No. 344,831
5 Claims. (Cl. 47—9)

This invention relates to mulching agricultural soil with synthetic materials such as thin plastic films. More particularly, it relates to a method and means for mulching wherein there is employed a synthetic polymer material which is degradable and adaptable to being worked into the ground after having served its useful purpose as mulch.

Plastic foams, petroleum emulsions, ground corncobs, and the like are known and have been utilized as soil-mulching materials. More recently, polyethylene film has been found to be a very useful mulch. In such use, strips of film are applied to the surface of row crops providing advantages such as improved germination, increased crop yields, reduced moisture evaporation, and better weed control. When its presence on the ground is no longer desired, the film must be physically removed from the fields. The necessity of such removal increases costs and complicates post-harvest field preparation. Currently, the film is collected and burned by means of machinery specifically designed for this purpose. There is a need for a plastic mulching material which does not require removal from the field after fulfilling its function as a mulch.

It is therefore an object of this invention to provide means for mulching agricultural soils with plastic materials such as thin films suitable for such purposes which, having served such purpose, can be disposed of without being removed from the field. A further object is to provide plastic mulching materials which can be disposed of in the field with conventional agricultural equipment and practices. It is a still further object of the invention to provide a plastic mulching material which can be worked into the ground. A more specific object of the invention is to provide a synthetic plastic mulching material, having the pulching properties of polyethylene, which totally degrades upon exposure to ordinary weathering conditions and can be worked into the ground with ordinary tilling tools and methods.

Various other objects, advantages, and features of the invention will become apparent from the following description.

The objects of this invention are attained by a method and means for mulching agricultural soil with a synthetic plastic mulching material comprising a copolymer of ethylene and an ethylenically unsaturated carboxylic acid. More particularly, the plastic mulching material of this invention comprises a copolymer of a major proportion of ethylene and from about 2 to about 20 percent by weight based on the copolymer of an acidic comonomer selected from $\alpha,\beta$-ethylenically unsaturated mono- and polycarboxylic acids and acid anhydrides having from 3 to 8 carbon atoms per molecule and partial esters of such polycarboxylic acids wherein the acid moiety has at least one carboxyl group and the alcohol moiety has from 1 to 20 carbon atoms. Specific examples of such acidic comonomers are acrylic acid, methacrylic acid, crotonic acid, fumaric acid, maleic acid, itaconic acid, maleic anhydride, monomethyl maleate, monoethyl maleate, monomethyl fumarate, and monoethyl fumarate. The copolymers can be prepared by methods known to the art and consists, in general, of polymerizing mixtures of ethylene and one or more of the specified acid comonomers at a pressure between 1000 and 3000 atmospheres and at a temperature from about 90° to 300° C. in the presence of a peroxy catalyst. Copolymers having a molecular weight from about 600 to about 100,000 are suitable for the purposes of this invention.

The composition of the mulching material can consist essentially of one or a mixture of such copolymers. Solid filler materials can be incorporated with the copolymer in the mulch composition for special purposes as set forth hereinafter.

The mulching material can be prepared and used in various ways. For example, the mulch composition comprising the specified copolymer can be fabricated into film or sheeting of any desired thickness and width and laid on the surface of the soil in the same manner as polyethylene film or sheeting. Films in the order of from about 0.5 to 5 mils in thickness are used. The film can be cut into pieces, ribbons, or shreds, and distributed on the ground. Other forms, as threads, pellets, granules, and the like are also suitable.

The mulch can be used in agricultural practice in usual ways. Often the mulch is applied as a layer to soil ready for planting, where seeds, seedlings, or the like are placed in the soil through appropriate openings in the mulch layer. Alternatively, the mulch can be distributed on the soil around growing plants.

Nutrients and other fillers are added to provide compositions for various mulching uses. For example, ammonia or phosphate-containing additives will furnish essential fertilizers upon degradation of the copolymer mulch. Carbon black may be added to the copolymer in various small proportions. Such a film offers advantages such as keeping the soil warm by retaining heat absorbed from the sun, thereby promoting accelerated seed germination. Other advantages such as moisture retention, root protection, sunlight elimination, and the like are also available to the user.

The ethylene-ethylenically unsaturated acid copolymer is particularly useful for mulching because of properties which promote degradation upon exposure to weathering conditions. By the term "degradation" is meant a conversion of the polymer to molecules centaining a smaller number of carbon atoms. In terms of physical condition or appearance, the degraded polymer becomes a brittle material which is easily incorporated into the ground by employing usual soil-tilling machinery and methods. The factor controlling the rate of copolymer degradation is the amount of unsaturated carboxylic acid comonomer present in the copolymer. Experimental tests show that increasing proportions of carboxylic acid comonomer cause an accelerated rate of degradation. For example, a strip of copolymer of 3.7 melt index and containing about 2% acrylic acid comonomer was found to take about 648 hours to degrade when the sample was exposed to outdoor weathering. Increasing the acrylic acid content to 12.5% resulted in a degradation time of about 480 hours. Under the same experimental conditions, polyethylene did not show any visible signs of degrading but remained in much the same condition as before the test.

By varying the amount of comonomer in the copolymer, an agricultural soil mulch is produced that slowly degrades at a predetermined rate, adapted to the needs of crops which mature at different rates. Therefore, crops such as sugar beets can be initiated under a film of this copolymer, maintained at lower costs for weeding and irrigation, but, more significantly, eliminate any cost previously necessary for removing the plastic material from the field. Expensive machinery once necessary to remove the latter are no longer needed.

The following examples are illustrative of the invention and are not intended to limit the scope thereof.

Example 1

A strip of ethylene-acrylic acid copolymer film, 3.0 mils in thickness and 20 inches in width, is applied and anchored as a mulch to a row crop by means of a film-laying machine. During the growing season, the film thus placed is exposed to weathering conditions until it becomes brittle and breaks apart when touched. After the film has weathered and is no longer needed as a mulch, a soil-tilling machine is used to mix the brittle copolymer into the ground.

Example 2

Tests were carried out to demonstrate the weatherability of the polymer composition and the rate of degradation. Strips of ethylene-acrylic acid copolymer film, 1.5 mils in thickness, were placed under an ultraviolet light (type LL 1,200 w., 285 v., 4.7 a. Hanovia Lamp–275 intensity). Four samples of copolymer containing from 2.0% to 12.5% acrylic acid were exposed to the light. It was found that as the percent acrylic acid was increased from 2.0% to 12.5%, correspondingly less time elapsed until the copolymer became brittle. Polyethylene exposed to the same conditions did not degrade at all. From the table below it may be seen that the copolymer containing only 2% acrylic acid took substantially longer to degrade than did the copolymer containing 12.5% acrylic acid.

| Sample | Melt Index | Density | Percent Acrylic Acid | Hours to Degrade |
|---|---|---|---|---|
| Copolymer | 3.7 | 0.9203 | 2.0 | 228 |
| Do | 3.8 | 0.9359 | 8.8 | 144 |
| Do | 4.9 | 0.9416 | 10.0 | 120 |
| Do | 3.7 | 0.9452 | 12.5 | 144 |
| Polyethylene | 2.0 | 0.9190 | 0 | [1] >228 |

[1] No visible degradation at termination of the test.

Example 3

Strips of ethylene-acrylic acid copolymer about 3 mils in thickness were placed outdoors on a conventional panel holder so as to expose the strips to outdoor weathering conditions. The various samples contained the same amounts of acrylic as did those of Example 2. Under outdoor conditions, the samples take nearly five times as long to undergo the same degree of degradation as did those of Example 2. Again, polyethylene did not show any visible signs of degradation during the testing period.

| Sample | Melt Index | Density | Percent Acrylic Acid | Hours to Degrade |
|---|---|---|---|---|
| Copolymer | 3.7 | 0.9203 | 2.0 | 648 |
| Do | 3.8 | 0.9359 | 8.8 | 552 |
| Do | 4.9 | 0.9416 | 10.0 | 348 |
| Do | 3.7 | 0.9452 | 12.5 | 480 |
| Polyethylene | 2.0 | 0.9190 | 0 | [1] >684 |

[1] No visible degradation at termination of the test.

What is claimed is:

1. In a method for mulching wherein is applied to the surface of the soil a polymeric material requiring subsequent removal from said surface, the improvement which comprises applying to the soil a solid, degradable, thermoplastic mulching material comprising a copolymer consisting essentially of ethylene and an ethylenically unsaturated carboxylic acid comonomer, said comonomer being present in the copolymer in an amount from about 2 percent to about 20 percent by weight based on the weight of the copolymer.

2. The improvement according to claim 1 wherein the copolymer is a copolymer of ethylene and acrylic acid.

3. The improvement according to claim 1 wherein the copolymer contains comonomer in an amount in the range of from about 2 to 12.5% by weight.

4. The improvement according to claim 1 wherein the copolymer is applied to the surface of the soil as a film of about 0.5 mil to about 5.0 mils in thickness.

5. An agricultural method which comprises placing and maintaining around a plant, during the growing season, a mulch comprising a polymeric material consisting essentially of a solid, degradable copolymer of ethylene and an ethylenically unsaturated carboxylic acid, said acid being present in the copolymer in an amount from about 2 percent to about 20 percent by weight based on the weight of the copolymer, and subsequently disposed of said mulch by tilling it into the ground.

References Cited by the Examiner

UNITED STATES PATENTS

| | | | |
|---|---|---|---|
| 2,599,123 | 6/1952 | Pinkney et al. | 260—78.5 |
| 2,945,322 | 7/1960 | Gaeth et al. | 47—9 |
| 3,081,291 | 3/1963 | Richmond | 260—88.1 X |
| 3,121,973 | 2/1964 | Phillips et al. | 47—9 |

ABRAHAM G. STONE, *Primary Examiner.*

R. E. BAGWILL, *Assistant Examiner.*